United States Patent [19]

Huska

[11] Patent Number: 5,304,022
[45] Date of Patent: Apr. 19, 1994

[54] TAPERED THREADED BOLT WITH OVAL NUT

[76] Inventor: Paul Huska, 739 Moreno Ave., Los Angeles, Calif. 90049

[21] Appl. No.: 43,218

[22] Filed: Apr. 6, 1993

[51] Int. Cl.⁵ .................. F16B 21/00; F16B 37/16; F16B 35/00
[52] U.S. Cl. ..................... 411/366; 411/386; 411/418; 411/437; 411/553
[58] Field of Search ............. 411/366, 386, 417, 418, 411/437, 551, 553, 908

[56] References Cited

U.S. PATENT DOCUMENTS

| | | | |
|---|---|---|---|
| 741,953 | 10/1903 | Bonschur | 411/386 X |
| 1,096,763 | 5/1914 | Smith | 411/437 X |
| 1,451,970 | 4/1923 | Taylor | 411/418 |
| 1,987,474 | 1/1935 | Grant | 411/417 |
| 2,167,176 | 7/1939 | Grassberger | 411/437 X |
| 4,909,690 | 3/1990 | Gapp et al. | 411/908 X |
| 5,083,888 | 1/1992 | Gapp et al. | 411/908 X |

FOREIGN PATENT DOCUMENTS

2328152 12/1974 Fed. Rep. of Germany ...... 411/418
90/06449 6/1990 World Int. Prop. O. .......... 411/553

*Primary Examiner*—Neill R. Wilson
*Attorney, Agent, or Firm*—Cislo & Thomas

[57] ABSTRACT

This invention relates to a bolt having a tapered tip comprising of corresponding opposite flat and partially threaded portions that engage an oval nut having elongated internal adjacent sides, the ends of which are void of threads to enable bolt/nut alignment when initially inserted and tightened. Additionally, the tapered threaded bolt has an arcuate shaped or rounded first and/or second thread for providing self-alignment and preventing gouging or digging of internal threads when being inserted or screwed into any conventional nut or oval shaped nut. Moreover, inadvertent contact between the bolt and nut while in the process of initial insertion will not preclude uninhibited correct bolt insertion into the nut.

13 Claims, 2 Drawing Sheets

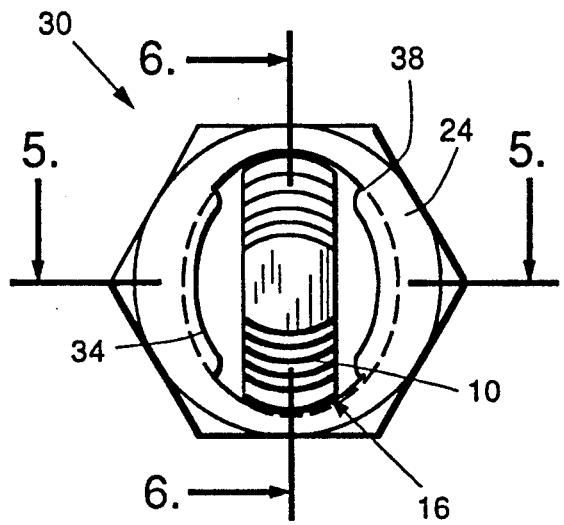
FIG. 6.
FIG. 7.
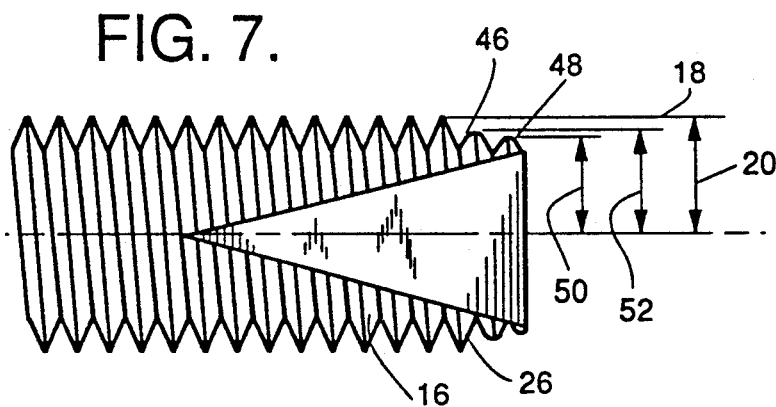
FIG. 8.
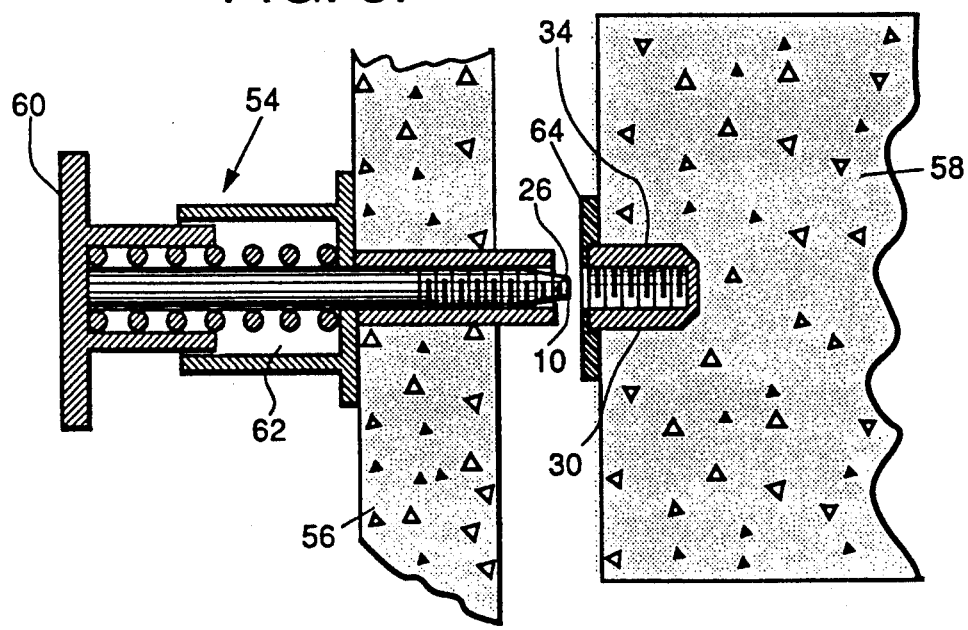

TAPERED THREADED BOLT WITH OVAL NUT

BACKGROUND OF THE INVENTION

This invention relates to the field of threaded bolts, screws, and nuts. More particularly, the invention pertains to a bolt having a tapered end with partial threads that engages an oval shaped nut having internal elongated adjacent sides, thereby allowing for uninhibited insertions of the bolt into the nut to ensure threaded engagement that will preclude cross threading.

Generally, there is little or no difficulty in starting a threaded bolt into a nut when the two mating parts have their longitudinal axes aligned. However, when the bolt enters the threaded part of the nut which is misaligned angularly with respect to the axis of the threaded bolt, the threads may initially engage incorrectly. Thereafter, as the bolt is driven towards full engagement, the threads of the bolt and/or nut fail by shearing and often the bolt is severed. This condition is called cross threading.

If the axis of the bolt is excessively misaligned angularly with respect to the longitudinal axis of the nut, The person engaging the bolt may readily perceive the misalignment because the threads failed to engage. Accordingly, corrective action is taken to align the bolt with the nut. However, when the misalignment is slight, the person driving the bolt forward may not be aware that the first bolt threads are in opposition to the first nut threads engagement in such a way that cross threading occurs. In cases such as these, the bolt is removed from the nut, and the nut threads are retapped or the nut is replaced, resulting in lost production, lost time incurred when making the necessary replacement, the cost of bolts and/or nuts, and in incidental repairs to related equipment.

Furthermore, cross threading occurs more frequently where power tools are used to drive a threaded bolt as is the case in production line assembly plants. To avoid this difficulty, a plant worker or craftsman may manually start the bolt threads into the nut to assure proper engagement of the first few bolt threads with those of the nut. Then, a power tool is attached to a socket that engages the bolt head or nut and the threading process is then completed. When conventional bolts are used and angular misalignment of the bolt is excessive, potential for cross threading is great unless the plant worker corrects the alignment problem before the power tool is applied to drive the bolt or nut to a fully engaged position. Cross threading can make it very difficult to disengage the bolt and nut resulting in considerable expense in the operation of large scale production line assemblies due to delays to replace damaged bolts and nuts, and even more critical where work is being performed upon equipment in the field or under adverse conditions.

Additionally, if cross threading is not corrected, the threads on both the bolt and the nut may seize together causing them to jam or produce a cold flow reaction. Once the bolt and nut combination have seized, it will not tighten further creating an insecure attachment which if undetected may result in unpredictable ways or forms of hazards with more or less disastrous consequences to life, limb and property.

The subject invention herein solves all of these problems in a new and unique manner which has not been part of the art previously. Some related patents are described below:

U.S. Pat. No. 4,789,288 issued to F. C. Peterson on Dec. 6, 1988

This patent discloses an anti-cross threading screw. The anti-cross threading screw comprises a head having a load bearing area, and a threaded cylindrical shank extending perpendicularly from the load bearing area. The tip of the shank is tapered in the offset. The screw prevents cross-threading because the non-threaded side of the screw slides over the internal threading of a nut when the screw tip is inserted into a nut, causing the partial threads to seat against the nut internal threading.

U.S. Pat. No. 5,073,073 issued to H. Kazino et al on Dec. 17, 1991

The patent is directed to a self-aligning bolt and a self-aligning nut. The bolt comprises a threaded shank extending from a head, and a pilot tip extending forwardly of the threaded shank. The pilot tip includes an intermediate portion for smoothly connecting to the threaded shank.

U.S. Pat. No. 4,973,209 issued to C. Essom et al on Nov. 27, 1990

This patent is directed to a screw for contaminated pretapped holes. The screw includes a full width non-tapered tubular shank section, a tapered tubular trunk and entry section extending from shank section, and a cylindrical tip.

U.S. Pat. No. 4,952,110 issued to Avooustis et al on Aug. 28, 1990

This patent discloses an anti-cross thread bolt. The bolt includes a head, a threaded shank projecting from the head, and a tip at the end of the shank opposing the head. The tip includes a non-threaded relatively smooth portion and a partially threaded portion. The smooth portion of the tip has an arcuate peripheral surface.

U.S. Pat. No. 4,981,406 issued to R. G. Weiss et al on Jan. 1, 1991

The patent is directed to a threaded fastener. The threaded fastener comprises a threaded shank extending from a head. The lower end of the shank has a tapered transition surface.

SUMMARY OF THE INVENTION

The present invention comprises a bolt or screw having a tapered end with partial threads lying along the same longitudinal axis as the threads on the bolt or screw's cylindrical shank. More particularly, the leading thread edges of the bolt or screw are blunted or rounded and smoothed to preclude digging or gouging into the nut in the course of the insertion process. By way of example but not of limitation, the first threads or chords of the bolt are rounded such that the height of the first thread is halfway between the minor and major root diameter of the major thread dimension along the shank.

Moreover, none of the references provide for a nut which defines an interior arcuate form with elongated adjacent sides which form chords, 180 degrees apart, which are void of threads and are so dimensioned to freely receive the partially threaded tapered bolt leading end. The threaded portions being congruent with the unthreaded arcuately shaped nutform.

Furthermore, the bolt and nut combination of the present invention provides an improved means for correct bolt and nut alignment when in the process of initial insertion, thus ensuring correct bolt to nut thread engagement throughout the complete bolt/nut tightening process.

Accordingly, it is an object of the present invention to provide an improved bolt and nut combination to prevent cross threading, thereby advancing the technology of bolts, screws, and nuts enhancing product or equipment reliability, especially where injury or life is concerned, and damage to property. Also, it is an object of the invention to provide a quick interconnection between a bolt and or a nut.

The bolt of the present invention operates to prevent cross threading when inserted into a nut because the tapered end of the unthreaded sides allow the bolt to pass into and through the arcuate elongated shaped nut, the arcs or chords of which are void of threads and are disposed 180 degrees apart. The leading end of the bolt is also tapered, hence only partially threaded with the threads lying along the same longitudinal axis as the threads on the bolt's cylindrical shank. Once the bolt has entered the oval nut and the process of insertion continues the threads on the bolt's cylindrical shank can be rotated squarely into the oval nut without cross threading.

The object of the present invention is to allow the bolt to easily pass into the nut to engage, but the bolt can still screwedly engage the oppositely adjacent threads of the nut, and be tightened to the maximum designed torque capability or bolt application requirements for the bolt/nut combination.

Another object of the present invention is to provide a bolt with an arcuate shaped or rounded and smoothed off first thread or chord which when inserted into a conventional nut without being rotated will engage the first nut thread so that the bolt threads will be in phase with the nut threads, therefore when the bolt is rotated it will thread smoothly into the conventional nut. Additionally, the present invention provides a bolt and nut which is relatively easy, practical and inexpensive to manufacture.

BRIEF DESCRIPTION OF THE DRAWINGS

The above, as well as other, advantages of the present invention will become readily apparent to those skilled in the art from the following detailed description of the preferred embodiments when considered in the light of the accompanying drawings in which:

FIG. 6 is a cross sectional view of the bolt/nut combination of FIG. 5 along line 6—6;

FIG. 7 is a partial and enlarged elevational view of the bolt of FIG. 2;

FIG. 8 is a side cross sectional view of a cabinet door handle incorporating the tapered threaded bolt for engagement with the oval nut.

DESCRIPTION OF THE PREFERRED EMBODIMENTS

Figure 1:
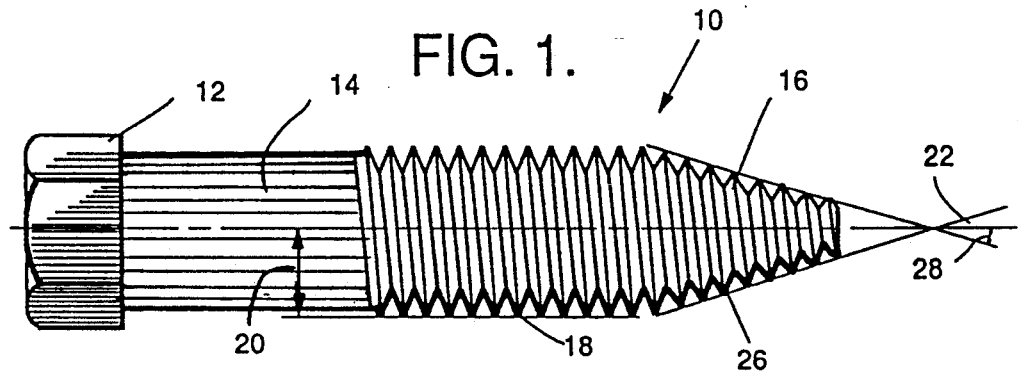
FIG. 1 is a side elevational view of a tapered threaded bolt in accordance with the present invention.
Figure 2:
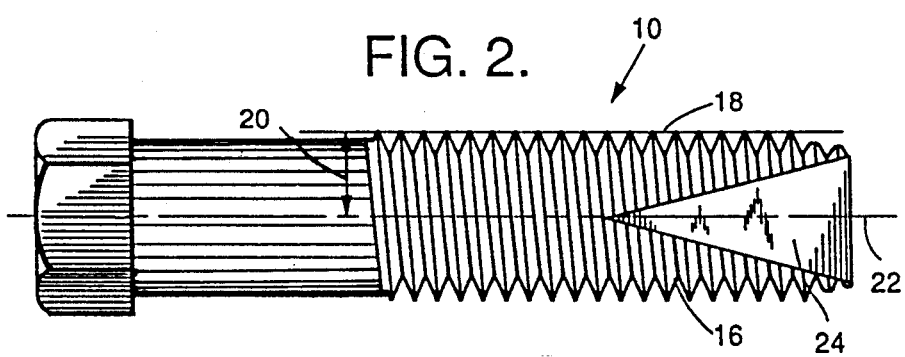
FIG. 2 is a top plan view of the bolt of FIG. 1.

Referring now to FIGS. 1 and 2 of the drawings wherein like numerals refer to like elements throughout, a tapered threaded bolt is illustrated and designated with the reference numeral 10. The tapered threaded bolt 10 includes a head 12, externally threaded shank 14 having a longitudinal axis 22 projecting from the head 12, and a tip 16 at the end of the shank 14 opposing the head 12.

The head 12 may be adapted for engagement by a tool for applying rotational torque. For example, the head 12 may be slotted to receive a flat or phillips head screwdriver or may be formed with a hexagonal shape to provide parallel flat areas for receiving a wrench or an allen head.

The shank 14 includes a threaded peripheral surface 18 having a predetermined major thread radius 20. The threaded surface 18 may be continuous about the shank 14 defining a substantially circular cross-section about the longitudinal axis 22.

The tip 16 projects away from the shank 14 such that it lies along the longitudinal axis 22. The tip 16 preferably includes corresponding opposite nonthreaded relatively flat portions 24 and correspondingly opposed partially threaded portions 26. The partially threaded portions 26 have peripheral surfaces which are coincident and continuous with threaded surface 18. The threaded portions 26 and nonthreaded portions 24 are continuous and blend into each other defining a non-circular or a partially-circular axial cross section 16.

The nonthreaded portions 24 are inwardly tapered with respect to the longitudinal axis 22 according to a predetermined taper angle 28. The taper angle 22 is determined by the individual bolt characteristics including, the bolt's thread size, thread pitch, thread angle, thread coarseness, and the desired torque value requirement for the bolt. By way of example but not of limitation, a quarter inch bolt having coarse threads could have a taper angle 28 of between approximately 2 and 10 degrees.

Figure 3:
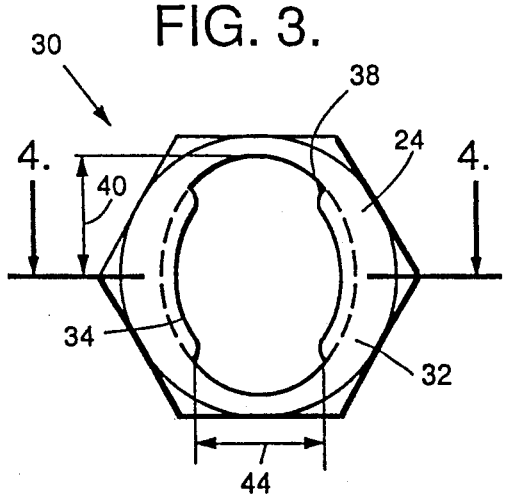
FIG. 3 is a rear elevational view of an oval nut in accordance with the present invention.
Figure 4:
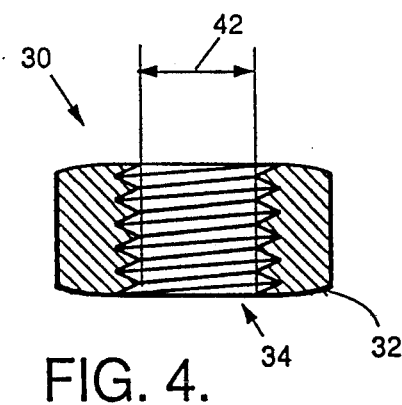
FIG. 4 is a cross section of view of the nut of FIG. 3 along line 4—4.

FIGS. 3 and 4 of the drawings shows an oval nut 30 made in accordance with the invention, wherein the nut body 32 defines a threaded circular bore 34 having an identical thread radius 42 as the major thread radius of bolt 10. The circular bore 34 further defines corresponding opposite inner portions 38 shaped as chords which are threadless. The radius 40 of the chords are greater than the major thread radius of the bolt and the width 44 of the chords are greater than the width of the tapered bolt angle 28 of bolt 10 to allow for insertion of the bolt into nut 30.

Figure 5:
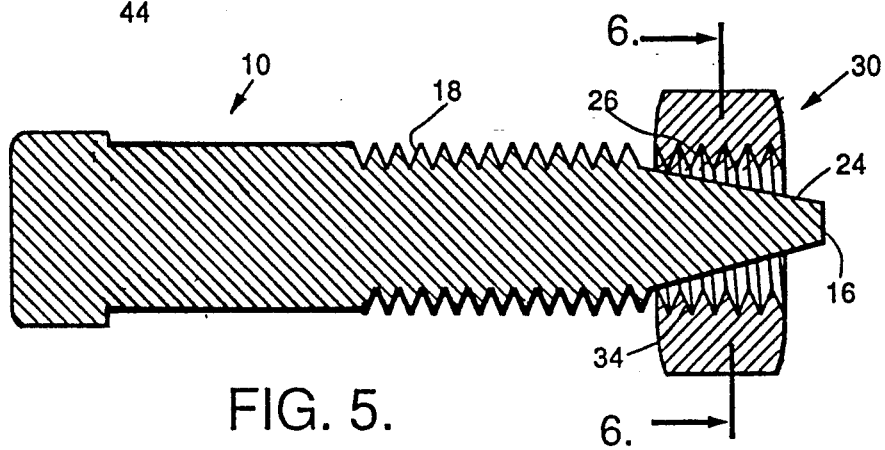
FIG. 5 is a cross sectional view of the bolt of FIG. 1 inserted into the nut of FIG. 3 prior to rotation of the nut for tightening.

The bolt prevents cross threading because, as shown in FIGS. 5 and 6, the unthreaded side 24 of the bolt 10 slides into the threaded circular bore 34 of the nut 30 when the tip 16 is inserted into nut 30, causing the partially threaded portions 26 to locate within the nut threaded circular bore 34. The bolt is thus positioned with the bolt partial tip threads in phase with the nut threading. When either the bolt or nut is rotated to tighten the bolt and nut combination, the partial threads act as a leader or guide so that the main body of the threaded shank of the bolt threads easily into the nut. Therefore, the bolt and nut of the present invention provides a new fastening means which will prevent problems incurred by cross threading. It is to be further understood that the threads of the bolt and nut need not be in contact with each other for proper threading to occur.

It is to be appreciated therefore that the particular shape of the corresponding opposite inner portions 38 formed in the nut 30 may be selected from a wide variety of geometric shapes having cross sections greater than the threaded surface 18 such that its threadless surface allows for passage of bolt 10. Such selection of a shape may be made by one of ordinary skill in the art.

Referring to FIG. 7, the tip 16 has partially threaded portions 26 which preferably includes first threads or chords 48 which are arcuate shaped or rounded off such that the thread radius 50 is smaller than the major thread radius 20 of threaded surface 18, thereby engaging the internal threads of a nut without digging or gouging the internal threads. Additionally, the partially threaded portions 26 may preferably include second threads or chords 46 which are accurate shaped or rounded off such that the thread radius 52 is smaller than the major thread radius 20 of threaded surface 18, but has a larger diameter than the thread radius 50 of first thread 48. The addition of the second thread 46 provides for an even smoother insertion into conventional nuts or oval nuts where digging or gouging between the bolt and nut threads may occur.

Although the description has been made on the function of the oval nut 30, it will be appreciated that the tapered threaded bolt 10 as described With reference to FIGS. 1 and 2, also functions in the same manner with any conventional nut.

One application of the nut and bolt combination can be seen in FIG. 8. A cabinet door handle assembly 54 is shown preferably mounted to a cupboard door or cabinet door 56, and is employed to hold the threaded tapered bolt 10 according to the invention for its engagement with oval nut 30. The oval nut 30 is anchored into a shelf 58 and properly aligned to receive bolt 10. The handle assembly 54 is provided with a knob 60 and contains a compression spring 62. The knob 60 is used to push the cupboard door 56 against shelf 58, thereby sliding the partially threaded portion 26 of bolt 10 into the nut threaded circular bore 34, and when inserted, the knob 60 is rotated clockwise about its central axis to start threading the bolt 10 into nut 30. At the point the cupboard door is closed the partial threads of both the nut 30 and bolt 10 are seated together in phase, thereby facilitating engagement of the internal threads of the nut 30 with the bolt 10. By turning the knob 60 clockwise a quarter of a turn or more, the cabinet door 56 is locked shut by the engagement of nut 30 and bolt 10 threads and the compression spring 62 is in a compressed mode, thereby making the installation vibration proof and preventing valuables from falling out in instances such as an earthquake. When the cabinet door 56 is to be opened, the knob 60 is rotated counterclockwise until the bolt 10 threads are entirely disengaged from the oval nut 30 and compression spring 62 expands completely retracting the bolt ID from nut 30 to assure complete bolt retraction.

Alternatively, a person may not wish to screwedly lock down the cabinet door 56, but to open and close the door 56 without having to turn the knob 60. To accomplish this the oval nut 30 comprises a retention clip 64. The retention clip 64 is mounted at the face of the oval nut 30, and defines a hole having a radius slightly greater than the bolts minor root diameter and being made of a material having sufficient flexibility to allow the bolt 10 to move easily through and into the oval nut. When the door 56 is closed the edge of the retention clip 64 meshes between the bolt's shank threads 26, thereby holding the door 56 shut. Similarly, pulling the knob 60 away from shelf 58 slides the retention clip's edge 64 over the bolt threads, thereby releasing the door.

The herein described bolt and nut of the present invention may be manufactured from a wide variety of materials including metals and plastics. The invention has many applications throughout industry as well as military or domestic uses.

It will be noted that the present invention provides a self-aligning bolt which can easily, quickly and smoothly engage a self-aligning nut or conventional nut even if there is a significant misalignment between the bolt and nut. It may be apparent that the invention has been described with several specific embodiments in mind and it is evident that many alternatives, modifications, and variations will be apparent to those skilled in the art in light of the foregoing description and because of the foregoing description. Accordingly it is intended to embrace all such alternatives, modifications and variations as fall within the spirit and broad scope of the appended claims.

What is claimed is:

1. A fastener for quick and accurate insertion and subsequent engagement with an aperture in a workpiece comprising: a bolt having an engagement end and a shank end, wherein said shank end including threading of a predetermined radius and spacing along a portion of said shank end, and wherein said engagement end including oppositely adjacent flat surfaces and additional threading adjoining said flat surfaces; said additional threading having leading thread edges, wherein the radius of said leading thread edges sized smaller than the radius of threading on said shank; and said flat surfaces dimensioned to allow said engagement end with said leading thread edges to readily engage the aperture in the workpiece upon insertion thereto, whereby the bolt is quickly and accurately insertable into the workpiece and provide for rapid and accurate engagement thereto.

2. A fastener according to claim 1 wherein said bolt having a longitudinal axis and wherein said flat surfaces inwardly taper with respect to said longitudinal axis at a predetermined angle toward said shank end, thereby providing greater ease of insertion into the workpiece.

3. A fastener according to claim 2 wherein said predetermined angle of said taper is between two and ten degrees.

4. A fastener according to claim 1 wherein said additional threading interrupted by said flat surfaces, wherein the periphery of said interrupted additional threading are arcuately shaped.

5. A fastener according to claim 1 wherein said additional threading interrupted by said flat surfaces, wherein the periphery of said additional threadings are rounded and smoothed.

6. A fastener according to claim 1 wherein said additional threading includes second partial threads, a periphery of said second partial threads rounded and smoothed such that the radius of said second partial threads being smaller than the radius of said threading of said shank.

7. A fastener comprising:
 a threaded bolt having a longitudinal axis and having a shank of different cross sections along its length and defining a threaded tip interrupted by opposite and complementary flat surfaces the periphery of said tip threadings being rounded and smoothed such that the radius of said interrupted tip threading sized smaller than the radius of said thread of said shank; and a nut defining a bore having an inner surface defining complementary threading and an enlarged area wherein said inner surface allows for passage of said tip of said bolt, and allows engagement with said bolt, whereby said bolt can be easily inserted into said nut and subsequently rotatively engaged.

8. A fastener according to claim 7 wherein said flat surfaces taper with respect to the bolt's longitudinal axis, said flat surfaces taper at a predetermined angle providing quick insertion of said bolt into said nut.

9. A fastener according to claim 8 wherein said flat surfaces tapers between 2 and 10 degrees from the bolt's longitudinal axis.

10. A fastener according to claim 8 wherein said enlarged area defines a chord having a radius greater than said nut threading and a width greater than the width of said taper angle to allow for quick insertion of said bolt into said nut.

11. A fastener according to claim 7 wherein said interrupted tip threading includes second partial threads, a periphery of said second particle threads rounded and smoothed such that the radius of said second partial threads being smaller than the radius of said threading of said shank.

12. A fastener according to claim 7 wherein said flat surfaces taper with respect to the bolt's longitudinal axis, said flat surfaces taper at a predetermined angle between 2 and 10 degrees from the bolt's longitudinal axis; said interrupted tip threading having second partial threads, a periphery of said second partial threads rounded and smoothed such that the radius of said second partial threads being smaller than the radius of said threading of said shank; said interrupted tip threading having first partial threads, a periphery of said first partial threads rounded and smoothed such that the radius of said first partial threads being smaller than the radius of said threading of said second partial threads; and said enlarged area defines a chord having a radius greater than said nut threading and a width greater than the width of said taper angle, for passage of said tip threadings of said bolt, and allows engagement with said bolt, whereby said bolt can be easily inserted into said nut and subsequently rotatively engaged.

13. A fastener for quick and accurate insertion and subsequent engagement with the shank of a bolt comprising: a nut defining a central bore having one or more partial threads of a predetermined radius, wherein said bore including oppositely adjacent inner portions enlarged in diameter to readily engage the shank of the bolt having a complementary dimension, said opposite inner portions define chords having a radius greater than said thread radius of said partial threads whereby the bolt can be quickly and accurately insertable into said bore and provide for rapid and accurate engagement thereto.

* * * * *

UNITED STATES PATENT AND TRADEMARK OFFICE
CERTIFICATE OF CORRECTION

PATENT NO. : 5,304,022
DATED : April 19, 1994
INVENTOR(S) : Paul Huska

It is certified that error appears in the above-identified patent and that said Letters Patent is hereby corrected as shown below:

On drawing sheet 2, Fig. 6, delete the line 6-6.
Column 1, line 10, delete "adjacent" and insert thereof --opposite--;
    Column 1, Line 25, please delete "The", and insert thereof --the--;
    Column 1, Line 62, please delete "have", and insert thereof --has--;
    Column 2, Line 60, please delete "adjacent", and insert thereof --opposite--;
    Column 4, Line 41, please delete "major", and insert thereof --minor--.
Col. 7, claim 11, line 23, delete "particle", and insert thereof --partial--.

Signed and Sealed this

Sixth Day of September, 1994

Attest:

BRUCE LEHMAN

*Attesting Officer*     *Commissioner of Patents and Trademarks*